US009665750B2

(12) United States Patent
Nikitin et al.

(10) Patent No.: US 9,665,750 B2
(45) Date of Patent: May 30, 2017

(54) RFID SYSTEM WITH LOCATION CAPABILITY

(71) Applicant: INTERMEC IP CORP, Everett, WA (US)

(72) Inventors: Pavel Nikitin, Seattle, WA (US); Stephen J. Kelly, Marion, IA (US)

(73) Assignee: INTERMEC IP CORP, Lynnwood, WA (US)

( * ) Notice: Subject to any disclaimer, the term of this patent is extended or adjusted under 35 U.S.C. 154(b) by 0 days.

(21) Appl. No.: 14/956,910

(22) Filed: Dec. 2, 2015

(65) Prior Publication Data

US 2016/0188918 A1    Jun. 30, 2016

Related U.S. Application Data

(60) Provisional application No. 62/099,102, filed on Dec. 31, 2014.

(51) Int. Cl.
*H04Q 5/22* (2006.01)
*G06K 7/10* (2006.01)
*G06Q 10/00* (2012.01)
*G06K 19/07* (2006.01)

(52) U.S. Cl.
CPC ..... *G06K 7/10128* (2013.01); *G06K 19/0716* (2013.01); *G06Q 10/00* (2013.01)

(58) Field of Classification Search
CPC ...... G01N 33/182; G01N 21/78; G01N 21/80; G01N 33/18; G01N 2021/7759; H04N 7/183; G06K 7/10722; G06K 7/1417; G06T 7/0004; G06T 2207/30124; G06T 2207/10024
See application file for complete search history.

(56) References Cited

U.S. PATENT DOCUMENTS

| | | | | |
|---|---|---|---|---|
| 2005/0237844 A1* | 10/2005 | Hyde | ................. | G06K 19/0723 365/228 |
| 2007/0008115 A1* | 1/2007 | Morhard | ............ | G08B 13/2462 340/539.13 |
| 2007/0229261 A1* | 10/2007 | Zimmerman | ........ | H04B 5/0062 340/572.1 |
| 2012/0249303 A1* | 10/2012 | Hadley | ................. | G06K 7/0008 340/10.1 |
| 2013/0204422 A1* | 8/2013 | Ross | ...................... | B21D 31/04 700/117 |
| 2014/0229246 A1* | 8/2014 | Ghaffari | ............. | G06K 19/0723 705/13 |
| 2015/0015366 A1* | 1/2015 | Hoffman | .............. | G06Q 10/087 340/5.61 |

(Continued)

*Primary Examiner* — Erin File
(74) *Attorney, Agent, or Firm* — Oliff PLC; R. Brian Drozd

(57) ABSTRACT

Provided are RFID systems, methods and RFID tags according to various aspects. An infrared (IR) beam, from an IR transmitter, is outputted in a first direction so that an RFID tag with an IR sensor adds a flag to stored data in the RFID tag in response to the RFID tag's IR sensor detecting the IR beam. An RF interrogation signal is outputted by an RFID reader, and a response is received from the RFID tag to the RF interrogation signal. It is determined whether the flag is contained in the RFID tag's response to the RF interrogation signal, and if so, the RFID tag is determined to be in the first direction relative to the IR transmitter.

22 Claims, 6 Drawing Sheets

(56) References Cited

U.S. PATENT DOCUMENTS

| 2015/0269818 | A1* | 9/2015 | Jain | G08B 13/248 |
| | | | | 340/572.1 |
| 2016/0004953 | A1* | 1/2016 | Karani | G06K 19/07758 |
| | | | | 235/492 |
| 2016/0188918 | A1* | 6/2016 | Nikitin | G06K 7/10128 |
| | | | | 340/10.51 |

* cited by examiner

RFID SYSTEM WITH LOCATION CAPABILITY

CROSS-REFERENCE TO RELATED APPLICATION

This nonprovisional application claims the benefit of U.S. Provisional Application No. 62/099,102, filed Dec. 31, 2014. The disclosure of the prior application is hereby incorporated by reference herein in its entirety.

BACKGROUND

Handheld or mobile computers are widely used, such as in different field mobility environments. For example, these computing devices may be used by mobile field service and transportation workers to allow different types of mobile operations, such as in-field computing, radio frequency identifier (RFID) scanning, barcode scanning, and communication with remote external devices, among others.

For RFID scanning, RFID scanners may use one or more RFID methods for different applications, including for smart cards, supporting maintenance tasks, identification badges, tracking objects in manufacturing, retail inventory management, etc. An RFID tag can be attached, e.g., to an inventory object. An RFID apparatus can be configured with an RFID reading device including one or more antennas to read the memory of an RFID tag attached to an inventory object.

The RFID apparatus may be a handheld device with integrated RFID reading capabilities that can read RFID tags from a range of distances, such as during a retail floor inventory operation. However, one may not know whether all physical structures such as retail floor fixtures (and by extension, all items with attached RFID tags) in a given department have been inventoried and the subsequent determination of the location of a particular RFID tagged inventory item can be difficult. For example, it can be quite time consuming for the user of an RFID apparatus to perform retail floor inventory location operations because conventional RFID devices may only be capable of providing a coarse or approximate location of a particular RFID tag coupled with an item, and in some instances cannot provide even coarse location information.

Thus, while one benefit of RFID, compared with traditional barcode scanning, is that the user does not need line of sight to the tag in order to collect data, the absence of the one to one correspondence that the line of sight gives the user creates a problem when the user is searching for a particular tagged item. Moreover, as RFID tags become more ubiquitous, it is becoming more difficult to know what tags are actually being read.

There is no way to know where tags are specifically, and as such, there is a need to be able to tell which RFID tags the handheld reader is pointing at.

SUMMARY

To overcome these and other challenges, aspects of various methods and systems are disclosed herein. For example, exemplary embodiments of the present application describe methods and systems to locate RFID tags. The methods and systems are based on using infrared transmitter with narrow beam mounted on the front of handheld RFID reader. The RFID tag has an infrared ("IR") sensor and detects if it is illuminated by the infrared beam from the RFID reader.

In one embodiment, a system may include a transmit antenna to output an RF interrogation signal; at least one receive antenna to receive responses to the RF interrogation signal; an IR transmitter configured to output an IR beam in a first direction, wherein RFID tags having an IR sensor that senses the IR beam add a flag to stored data in the RFID tag; a processor configured to receive a response to RF interrogation signal and to determine if the flag is in the response, wherein if the flag is determined to be in the response, the RFID tag is determined to be in the first direction relative to the IR transmitter.

In another embodiment, a method is provided. In the method, an IR beam, from an IR transmitter, is outputted in a first direction so that an RFID tag with an IR sensor adds a flag to stored data in the RFID tag in response to the RFID tag's IR sensor detecting the IR beam. An RF interrogation signal is outputted by an RFID reader, and a response is received from the RFID tag to the RF interrogation signal. It is determined whether the flag is contained in the RFID tag's response to the RF interrogation signal, and if so, the RFID tag is determined to be in the first direction relative to the IR transmitter.

In yet another embodiment, a radio frequency identification (RFID) tag system is provided that includes memory containing stored data, at least one antenna, and an infrared (IR) sensor to detect an IR beam from an IR transmitter from a first direction. A flag is added to the stored data in the memory in response to the IR sensor detecting the IR beam from the IR transmitter from the first direction. One or more antennas of the RFID system receives an RF interrogation signal from a transmit antenna of an RFID reader and output a response containing the stored data from the RFID tag system to the RF interrogation signal. The RFID tag system is determined to be location in the first direction relative to the IR transmitter in response to determining that the flag is contained in the response to the RF interrogation signal.

DETAILED DESCRIPTION

Figure 1:
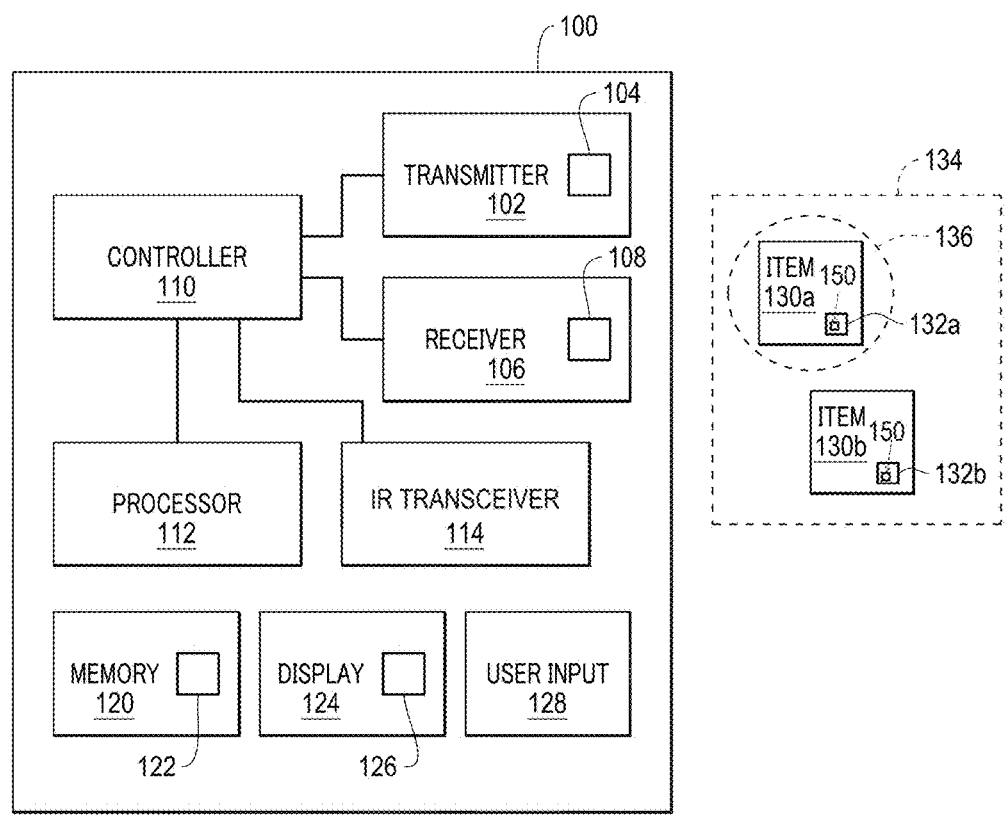
FIG. 1 is a block diagram illustrating a RFID tag location system according to one embodiment.

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described below with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Handheld or portable computing devices can be used in many different applications. Accordingly, while various embodiments may be described in connection with identifying items or inventory in a particular environment, the various embodiments are not so limited. For example, various embodiments may be used to identify or locate different types of RFID tags or items to which RFID tags are coupled.

When RFID scanning is performed, difficulties may arise when searching for a particular tagged item because RFID does not require line of sight reading. Accordingly, it may be difficult and time consuming to locate a particular item coupled with an inventoried RFID tag, resulting in frustration to the user.

Some embodiments of the present application describe systems and methods to facilitate locating a particular RFID tag, such as locating an RFID tagged item with a handheld device. In one embodiment, methods and systems provided herein are based on using infrared transmitter with a narrow beam mounted on the front of handheld RFID reader. The RFID tag may have an IR sensor and knows if it is illuminated by the infrared beam from the reader.

In some embodiments, a handheld UHF RFID reader system may include a low cost IR transceiver to the reader, and an IR sensor included with the RFID tag. If the RFID tag senses the IR from the reader, it flags its user data. As a result, the reader will know, out of many tags that it is reading, which ones are directly in front (if IR transceiver on the reader faces forward). The power of the IR transceiver can be set low so that the signal that reflect off the walls and floors do not trigger the IR sensor on the tag—only the direct beam matters, according to an embodiment.

It should be understood that while various embodiments may be described in connection with a particular RFID device or scanning for a particular type of tag, the various embodiments are not limited to such devices or scanning and may be used with different devices for performing scanning for different types of tags. Additionally, various embodiments may be operate in different settings or may be used for different applications. For example, one or more embodiments may be used for tag inventory to store images of tag locations when a determination is made that the RFID scanner (such as RFID handheld) has crossed or passed by the tag (e.g., RFID tag passed in front of the scanner). In this mode of operation, a priori knowledge of the tag identification is not needed and images of the tags that are read can be stored with the location for later use.

It should be noted that the RFID tag location system and various components are referred to herein for ease of illustration. However, it should be understood that the system and various components may be configured as any type of RFID scanning system for locating RFID tags in different locations and orientations.

One embodiment of a RFID tag location system 100 is shown in FIG. 1. The system 100 may be embodied as or form part of a handheld RFID scanner. For example, the system 100 may be embodied or form part of a mobile computing device, such as an Intermec mobile computer available from Honeywell Scanning and Mobility.

The RFID tag location system 100 can comprise a transmitter 102 having one or more transmit antennas 104 and a receiver 106 having one or more receive antennas 108. It should be noted that although one transmit antenna 104 and one receive antenna 108 are illustrated, the system 100 can comprise additional transmit or receive antennas 104, 108.

The transmitter 102 and receiver 106 are activated to scan a region of interest 134 to acquire RFID tag location information. The transmitting and receiving may be performed using RFID scanning techniques described herein.

The system 100 can also comprise a controller 110 coupled to the transmitter 102 and receiver 106. It should be noted that any type of communicative or operative coupling may be used, such as any type of wireless or wired communication. The controller 110 is configured to control the operation of the transmitter 102 and receiver 106, such as to control the transmissions by the transmit antenna 104 and the reception by the receive antennas 108. In one embodiment, the controller 110 is a transmit and receive controller configured to control the radio-frequency (RF) pulses sent to the transmit antenna 102 and the communication of signals received by the receive antennas 108. However, as described in more detail herein, the controller is also configured to control other components of the system 100. For example, the controller may be configured to control an IR transmitter 114 which has a narrow beamwidth and is directional.

The system 100 can further comprise a processor 112 coupled to the controller 110. As described in more detail herein, the processor 112 can control the operation of the controller 110 to transmit and receive as desired or needed. The processor 112 is also configured in various embodiments to process received signal information, such as responses to RFID inquiries used to determine the location of one or more RFID tags as described herein.

For example, in one or more embodiments, the system may determine the position of an RFID tag (which may be coupled to an object or item) that has been contacted with an IR transmission from the IR transceiver 114. The position of the RFID tag is determined because the RFID tag includes an IR sensor 150 so that when the IR sensor 150 senses the IR transmission from the IR transceiver 114, the RFID tag 132a then flags (e.g., appends one or more bytes) pre-stored data. In this regard, when the RFID tag data is read by the receiver 106 (in response to the RFID interrogation signals sent by the transmitter 102), the flag is recognized as part of or associated with the read data from the RFID tag 132a. As such, because the flag is detected and because the user knows where the IR transceiver 114 was pointed, the user then knows that the direction of the RFID tag was in the same direction as the IR transceiver was pointed.

The processor 114 is configured to receive the RFID tag response and/or read information from the response to the RFID interrogation signals.

Referring again to the system 100, a memory 120, which may be any type of electronic storage device, can be coupled to the processor 112 (or form part of the processor 112). The processor 112 may access the memory 112 to obtain stored image information 122 from the received response, including the flag from the RFID tag 132a, that aids or facilitates locating the RFID tags 132, such as by presenting the user with an indication of the location or direction information to help more easily identify the physical location of the RFID tag 132a or tags 132a, 132b that has sensed the IR transceiver.

The system 100 can also comprise a display 124 and user input device 128 coupled to the processor 112 to allow user interaction with the system 100. For example, the display 124 can allow visual guidance to locate one or more of the items 132 and/or by displaying flag-identifying data 126 of the RFID tags 132 associated with the items 130.

While FIG. 1 illustrates a particular connection arrangement of the various components, a skilled artisan would appreciate the fact that other connection arrangements may be made that are within the scope of this disclosure. Additionally, the various components may be housed within the same or different physical units and the separation of components within FIG. 1 is merely for illustration.

The system 100 can also comprise one or more communication subsystems to allow communication with external devices, such as networks, printers, etc. Thus, additional components may form part of or communicate with the system 100.

Figures 2A, 2B:
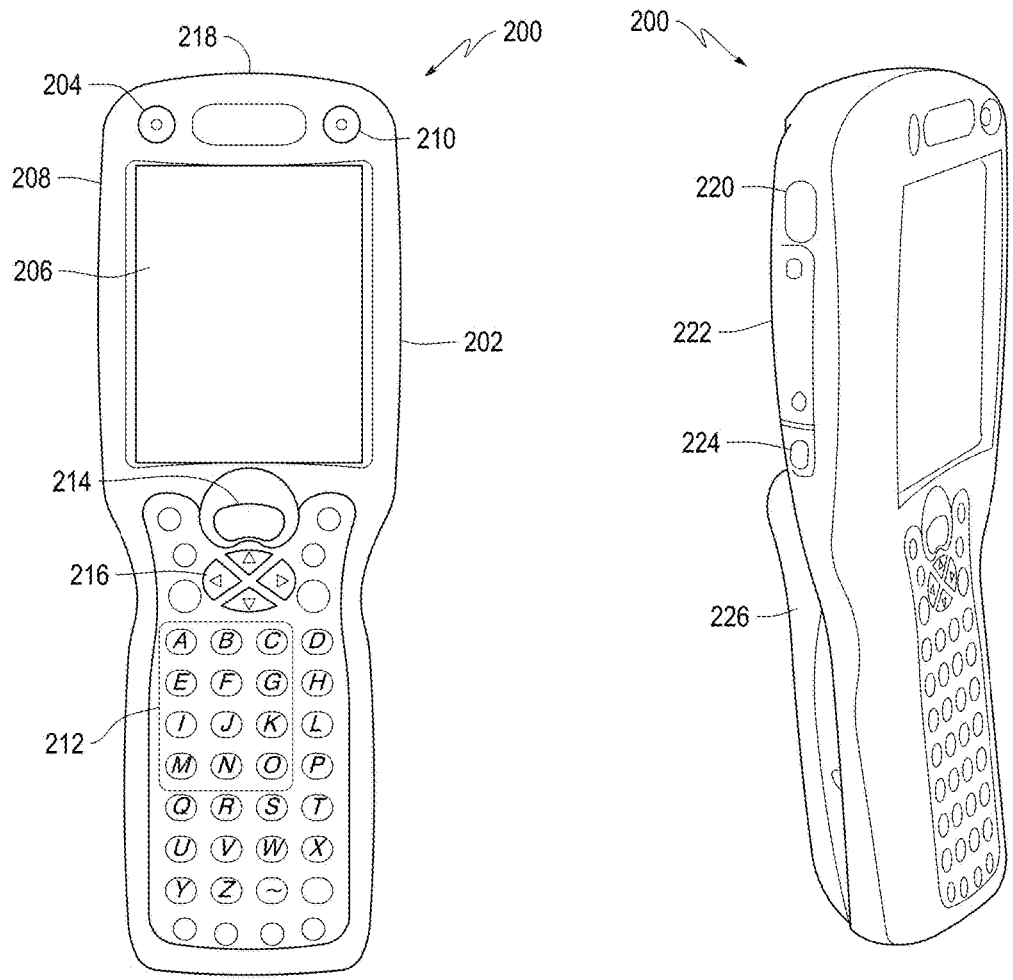
FIGS. 2A, 2B and 2C schematically illustrate an RFID apparatus according to one embodiment.

In some embodiments, the system 100 may be embodied as part of a RFID apparatus 200 is shown in FIGS. 2A (front panel view), 2B (oblique panel view) and 2C (bottom panel view). The RFID apparatus 200 can comprise a housing 202 within which other components of RFID reader 200 can be disposed. An LCD screen display with touch screen sensor 206 can be disposed on a front panel 208. Also disposed on the front panel 208 can be an operation LED 204, a scan LED 210, and keyboard 212 including a scan key 214 and navigation keys 216. An imaging window 218 can be disposed on the top panel of the housing 202. Disposed on the side panel (best viewed in FIG. 2B) can be an infrared transmission port 220, an access door to a secure digital (SD) memory interface 222, an audio jack 224, and a hand strap 226. Disposed on the bottom panel (best viewed in FIG. 1C) can be a multi-pin mechanical connector 228 and a hand strap clip 230.

Figure 2C:
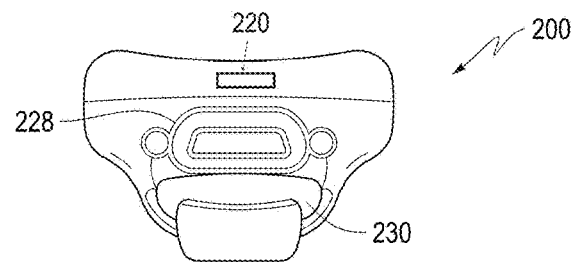

The infrared transmission port 220 may be placed on the top panel of the housing 202 of the RFID reader instead of on the side (as shown in FIG. 2B) to allow the IR transmission from the IR transceiver 114. This is shown in FIG. 2C which shows the alternate location of the infrared transmission port 220. Additionally, in various embodiments, the infrared transmission port 220 allows the IR transceiver 114 (shown in FIG. 1) within the housing 202 to be behind the infrared transmission port 220 for protection to have a field of view in front of the RFID apparatus 200.

Also disposed on the bottom panel (or alternatively on the top panel) can be an RFID antenna housing and an RFID read device (which may can include the transmitter 102 and receiver 106 shown in FIG. 1) within the housing 202.

While FIGS. 1A-1C illustrate some embodiments of a handheld system, a skilled artisan would appreciate that other types and form factors of terminal housings are within the scope of this disclosure.

Figure 3:
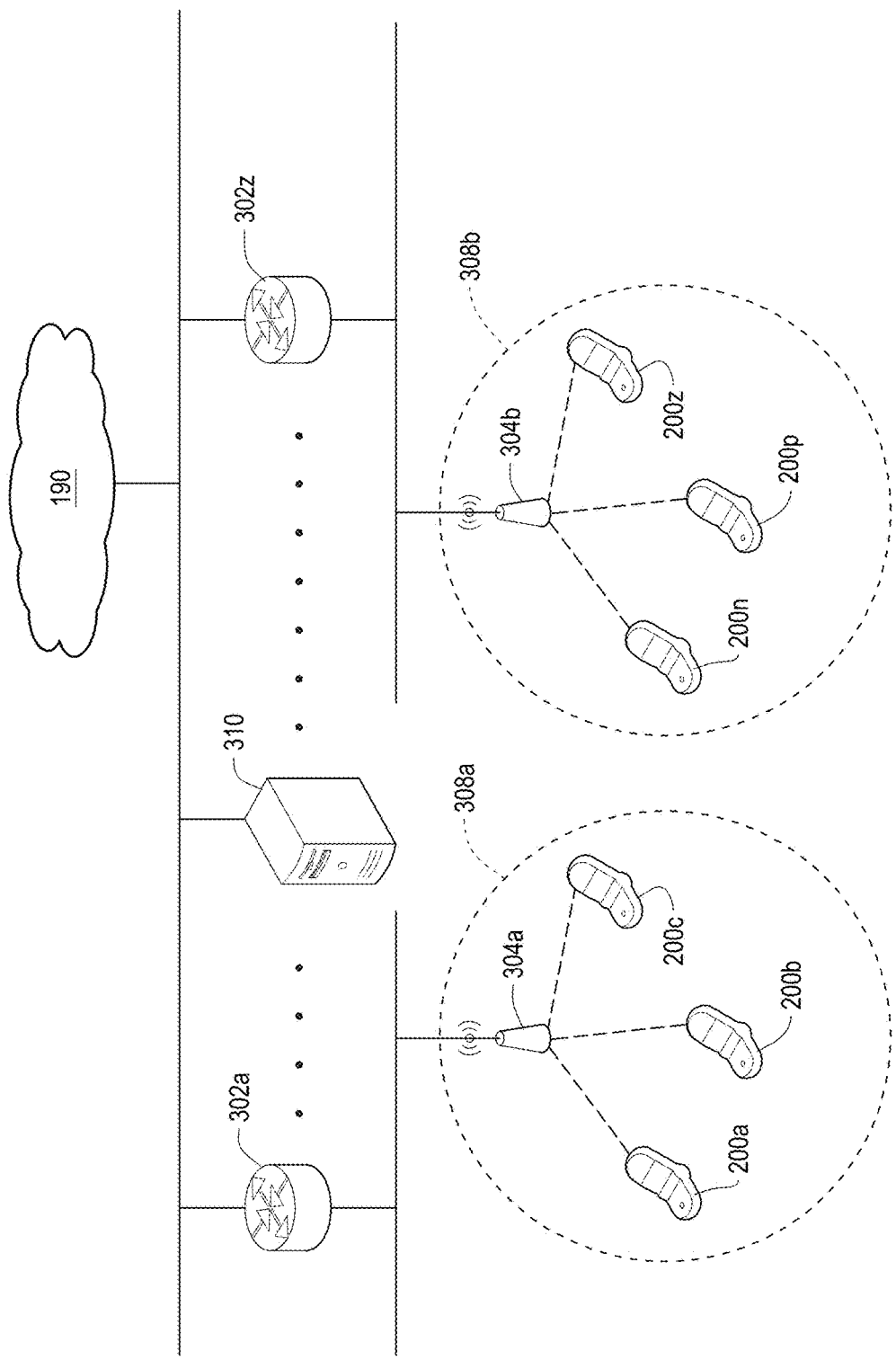
FIG. 3 is a block diagram of a network-level layout of a data collection system utilizing one or more RFID apparatus according to one embodiment.

In some embodiments, the system 100 and/or RFID apparatus 200 can be incorporated in a data collection system. The data collection system, schematically shown in FIG. 3, can include a plurality of routers 302a-302z, a plurality of access points 304a-304, and a plurality of RFID apparatus 200a-200z in communication with a plurality of interconnected networks 308a-308z. In one embodiment, the plurality of networks 308a-308z can include at least one wireless communication network. In one or more embodiments, one or more of the RFID apparatus 200 can comprise a communication interface which can be used by the RFID apparatus 200 to connect to the one or more of the networks 308a-308z. In one embodiment, the communication interface can be provided by a wireless communication interface.

One or more of the RFID apparatus 200 can establish communication with a host computer 310. In one embodiment, network frames can be exchanged by the RFID apparatus 200 and the host computer 310 via one or more routers 302, base stations, and other infrastructure elements. In another embodiment, the host computer 310 can communicate with the RFID apparatus 200 via a network 308, such as a local area network (LAN). In yet another embodiment, the host computer 310 can communicate with the RFID apparatus 200 via a network 308, such as a wide area network (WAN). A skilled artisan should appreciate that other methods of providing interconnectivity between the RFID apparatus 200 and the host computer 310 relying upon LANs, WANs, virtual private networks (VPNs), and/or other types of network are within the scope of this disclosure.

In one embodiment, the communications between the RFID apparatus 200 and the host computer 310 can comprise a series of HTTP requests and responses transmitted over one or more TCP connections. In one embodiment, the communications between the RFID apparatus 200 and the host computer 310 can comprise VoIP traffic transmitted over one or more TCP and/or UDP ports. A skilled artisan should appreciate that using other transport and application level protocols is within the scope of this disclosure.

Figure 4:
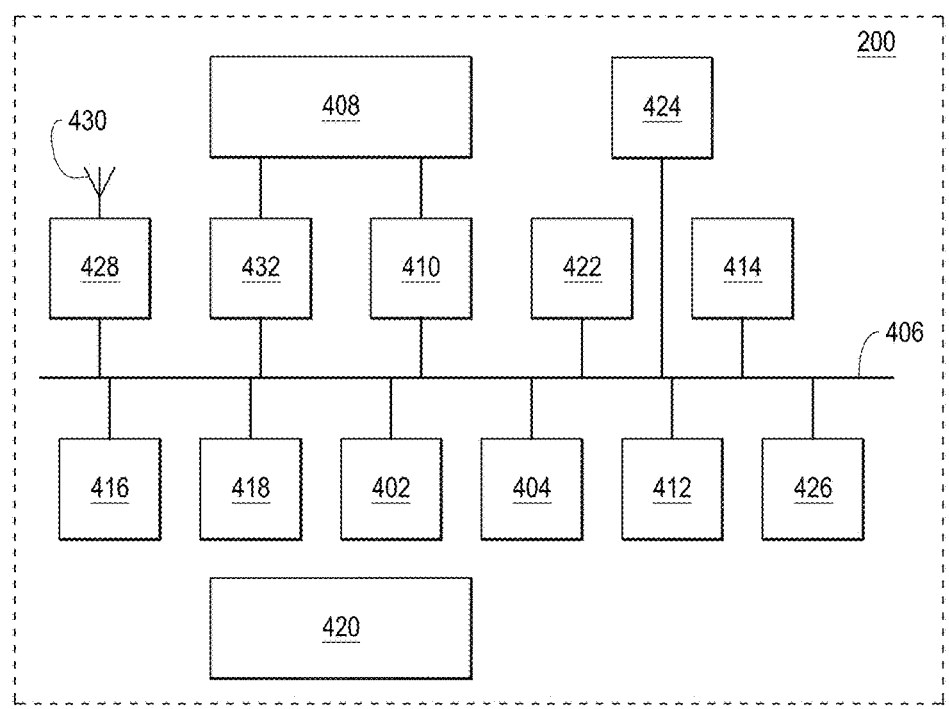
FIG. 4 is a block diagram of a component-level layout of an RFID apparatus according to one embodiment.

A component-level diagram of one embodiment of an RFID apparatus 200 will now be described with reference to FIG. 4. The RFID apparatus 200 can comprise at least one microprocessor 402 and a memory 404 (which may be embodied as the memory 120 shown in FIG. 1), both coupled to a system bus 406. The microprocessor 402 can be provided by a general purpose microprocessor or by a specialized microprocessor (e.g., an ASIC). In one embodiment, the RFID apparatus 200 can comprise a single microprocessor which may be referred to as a central processing unit (CPU). In another embodiment, the RFID apparatus 200 can comprise two or more microprocessors, for example, a CPU providing some or most of the RFID apparatus functionality and a specialized microprocessor performing some specific functionality (e.g., tag location determination as described herein). A skilled artisan should appreciate that other schemes of processing tasks distributed among two or more microprocessors are within the scope of this disclosure. The memory 404 can comprise one or more types of memory, including but not limited to random-access-memory (RAM), non-volatile RAM (NVRAM), etc.

The RFID apparatus 200 can further comprise a communication interface 408 communicatively coupled to the system bus 406. In one embodiment, the communication interface 408 may be by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family.

A module 410 is an additional modular component that can be replaced with upgraded or expanded modules and is coupled between the system bus 308 and the communication interface 408. This module 410 is compatible with, for example, auxiliary hard drives (including flash memory), RAM, communication interfaces, etc.

The RFID apparatus 200 can further comprise a camera system 412 (which may be embodied as the imager 114 in FIG. 1) and an image interpretation and processing module 414. In one embodiment, the image interpretation and processing module 414 receives image data from the camera system 412 and processes the information for use in determining the location of one or more RFID tags and presenting an image corresponding to that determined location. In another embodiment, the processing module 414, which is coupled to the system bus 406, exchanges data and control information with the microprocessor 402 or the memory 404.

The RFID apparatus 200 can further comprise a keyboard interface 416 and a display adapter 418, both also coupled to the system bus 406. The RFID apparatus 200 can further comprise a battery 420. In one embodiment, the battery 420 may be a replaceable or rechargeable battery pack.

The RFID apparatus 200 can further comprise a GPS receiver 422 to facilitate providing location information relating to the RFID apparatus 200. The RFID apparatus 200 can also comprise at least one connector 424 configured to receive, for example, a subscriber identity module (SIM) card. The RFID apparatus 200 can further comprise one or more IR transceiver device 426, provided by, for example, but not limited to, the IR transceiver 114. The RFID apparatus 200 still further can comprise one or more RFID reader 428 provided by, for example, but not limited to, an RFID reading device, a bar code reading device, or a card reading device. In one embodiment, the RFID apparatus 200 can be configured to receive RFID scanning information, such as responses received from activated RFID tags.

It should be appreciated that devices that read bar codes, read RFID tags, or read cards bearing encoded information may read more than one of these categories while remaining within the scope of this disclosure. For example, a device that reads bar codes may include a card reader, and/or RFID reader; a device that reads RFID tags may also be able to read bar codes and/or cards; and a device that reads cards may be able to also read bar codes and/or RFID. For further clarity, the primary function of a device may involve any of these functions in order to be considered such a device; for example, a cellular telephone, smartphone, or PDA that is capable of reading bar codes or RFID tags is a device that reads bar codes or RFID tags for purposes of this disclosure.

The RFID reader 428 may be configured to read RFID tags and acquire different types of information, for example, backscattered phase information as described herein and communicate such information to the microprocessor 402 or memory 404. In another embodiment, the RFID reader 428 can be configured to adjust the RFID transmit power level. Signals transmitted from or received by the RFID apparatus 200 may be provided via an antenna 430.

In some embodiments, the RFID apparatus 200 includes an inertial measurement unit (IMU) 432 (containing one or more of a 3-axis accelerometer, a 3-axis magnetometer and a 3-axis gyroscope sensor which may provide orientation information) utilized to record the position of the RFID apparatus 200 in three dimensional space. The IMU 432 also assists the RFID apparatus 200 in determining the orientation thereof, during the process of scanning for RFID tags as the RFID apparatus 200 moves through space. The orientation of the RFID apparatus 200 includes the position of the RFID apparatus 200 itself relative to a physical structure.

The RFID apparatus 200 can be at a given position, for example ($x_1$, $y_1$, $z_1$) but the orientation of the RFID apparatus at this position may vary. The RFID apparatus 200 may be held upright at a position to define one orientation, but the RFID apparatus 200 may also be moved to an angle relative to any direction in three dimensional space (while the position of the RFID apparatus 200 is unchanged). This movement represents a change in orientation. In one embodiment, during the scanning process, both the position and the orientation of the RFID apparatus 200 are calculated by the camera system 412 and/or the IMU 432 and the resultant data is stored and may be used to facilitate locating an item 130 (shown in FIG. 1) or positioning the RFID apparatus 200 as described in more detail herein.

As described herein, various embodiments allow for the determination and display of location information to facilitate locating an RFID tag 132 (shown in FIG. 1). For example, a user may enter a desired item 130 (shown in FIG. 1) to be located and a scanning process is thereafter automatically initiated or initiated by the front panel scan key 214 (shown in FIG. 2). During scanning, image information is acquired by the camera system 412 and may be displayed in real-time or subsequent to scanning to facilitate locating an item 130 (shown in FIG. 1) based on the identification (e.g., ID number) of an RFID tag 132 (shown in FIG. 1) that is read by the EIR device 428, which may be facilitated by using information relating to the position or orientation of the RFID apparatus 200 (e.g., guide a user to position the RFID apparatus 200 for proper scanning).

Figure 5:
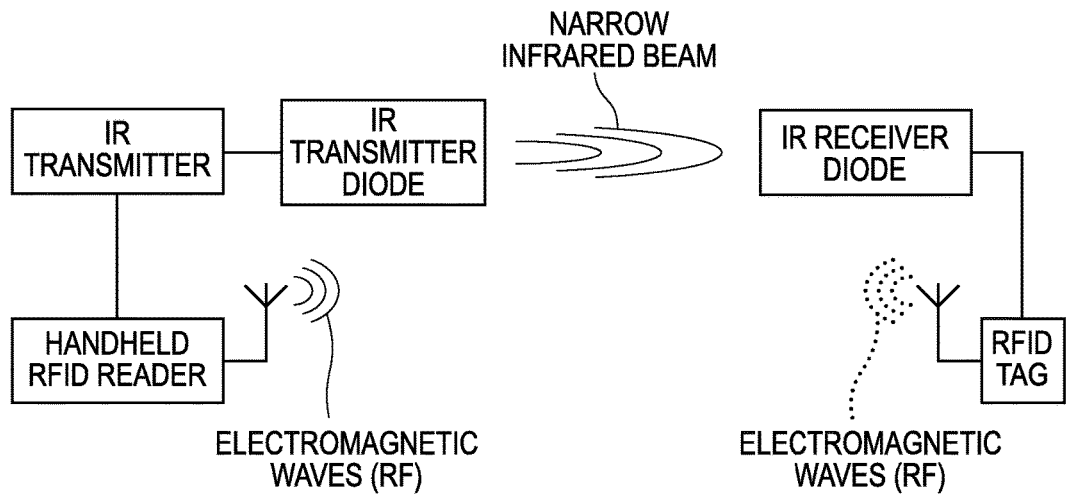
FIG. 5 depicts a scanning operation according to one embodiment.
Figure 6:
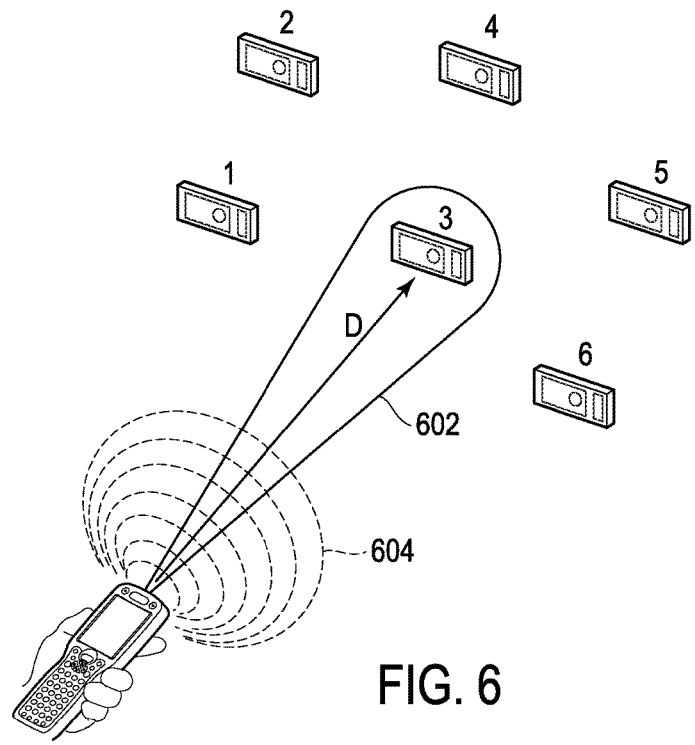
FIG. 6 depicts a scanning area according to one embodiment.
Figure 7:
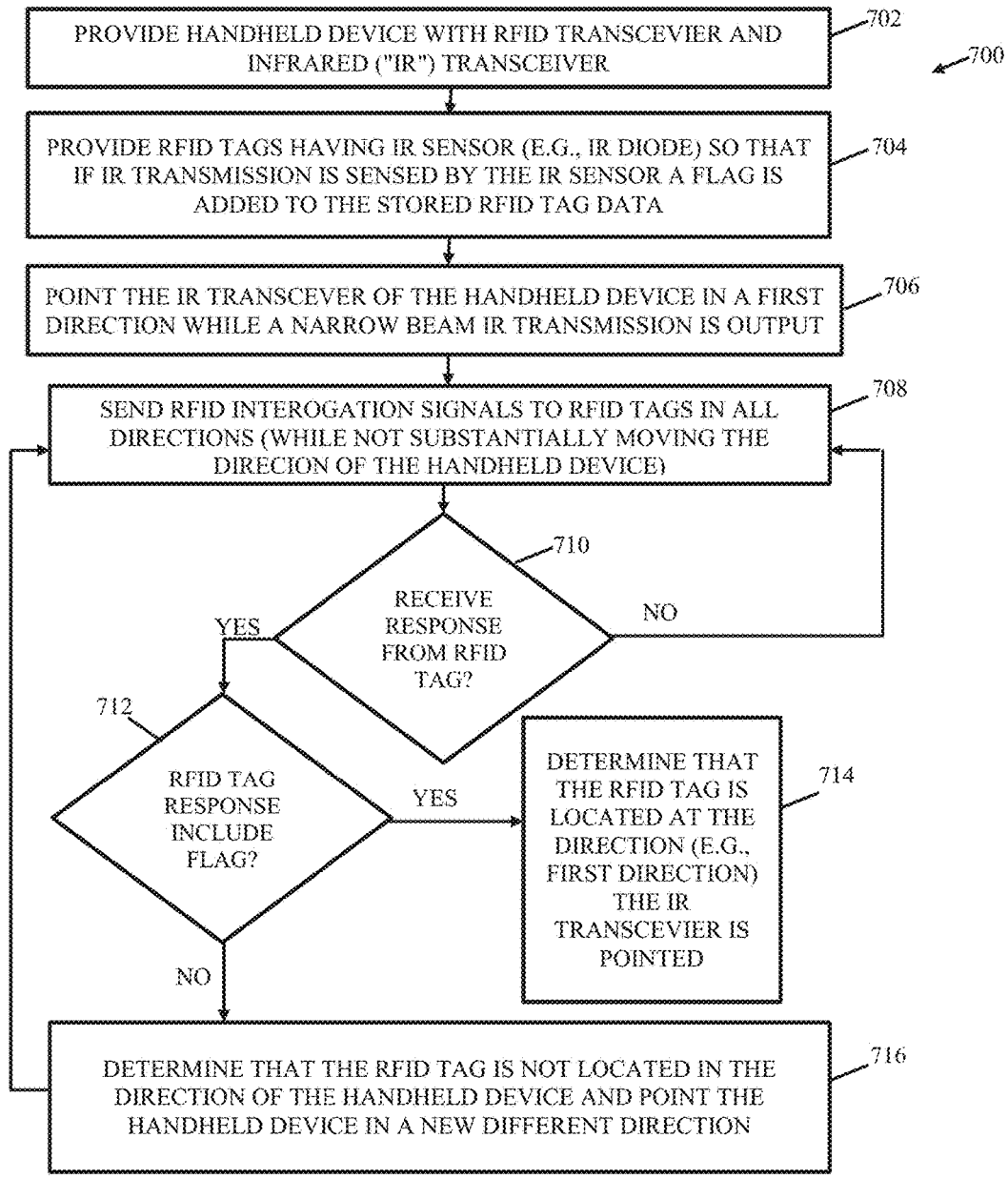
FIG. 7 illustrates a method for determining a location of a RFID tag according to one embodiment.

One or more embodiments include a method 700 as illustrated in FIG. 7. With reference also to FIGS. 1-6, the method 700 may be implemented or performed using one or more systems described herein, such as the system 100 and/or RFID apparatus 200. It should be noted that the steps of the method 700 may be performed in a different order and some steps may be performed concurrently. Additionally, some steps may be repeated.

The method 700 includes providing a handheld device with an RFID transceiver and IR transceiver (similar to those discussed above), in 702. Referring to FIG. 5, as shown, a handheld RFID reader has an antenna and an IR transmitter. The IR transmitter has an IR transmitter diode that outputs a narrow infrared beam only in one direction. The antenna of the RFID reader transmits electromagnetic waves (RF waves).

On the other side, the RFID tag is provided that has the IR sensor, such as an IR diode, so that if the IR transmission of the IR transceiver is sensed by the IR sensor, a flag is added to the stored RFID tag data and will be transmitted during a response, as provided by 704.

The RFID tag also includes an antenna for receiving the electromagnetic waves from the RFID reader. The RFID tag also includes an IR sensor (such as an IR receiver diode), which is configured to receive the narrow IR beam outputted from the IR transmitter diode only if the IR beam is directionally pointed to the IR sensor (otherwise the IR sensor does not sense the IR beam even though there may be reflections off of other objects). Thus, the IR beam has to be directly hitting the IR sensor for the sensor to detect the IR beam. This is illustrated in FIG. 6 where only the IR sensor of RFID tag 3 senses the IR beam 602 pointed in direction D" while at the same time the RFID antenna is outputting a radiation pattern 604.

In 706, the IR transceiver (and hence the handheld device) is pointed in a first direction (e.g., Direction "D" in FIG. 6) while a narrow beam of IR transmission is output, as shown in FIG. 6 and while an RFID interrogation signal is output by the RFID reader, as provided by 708.

In 710, if no tags respond, the method may revert back to 708; otherwise, if a response is received, the method continues to 712 where it is determined whether the RFID response includes the flag that indicates the IR sensor of the RFID tag sensed the IR transmitter. If so, the method proceeds to 714 where the system determines the direction of the RFID tag is the same as where the transceiver was pointed. Otherwise, the system determines that the RFID tag did not sense the IR transmitter and is located in a different direction, and the method may continue back to block 708 after the IR transmitter is adjusted to a different direction to determine if the RFID tag is in the different direction.

It should be noted that the system 100 can comprise one or more microprocessors (which may be embodied as the processor 112) and a memory, such as the memory 120, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, the system 100 can comprise two or more microprocessors, for example, a CPU providing some or most of the scanning functionality and a specialized microprocessor performing some specific functionality. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can provide communication using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A radio frequency identification (RFID) reader comprising:
   an infrared (IR) transmitter configured to output an IR beam in a first direction that causes an RFID tag to add a flag to stored RFID data in the RFID tag;
   a transmit antenna to output an RF interrogation signal;
   a receive antenna to receive a response containing the stored data from an RFID tag to the RF interrogation signal; and
   a processor configured to determine that the RFID tag is in the first direction relative to the IR transmitter if the response contains the flag, wherein the IR beam is such that, in response to an IR sensor of the RFID tag detecting the IR beam, the IR sensor adds the flag to stored data in the RFID tag.

2. The RFID reader of claim 1, wherein the processor is further configured to determine that the RFID tag is located in a direction other than in the first direction relative to the IR transmitter in response to determining that the flag is not contained in the RFID tag's response to the RF interrogation signal.

3. The RFID reader of claim 1, wherein the transmit antenna and the receive antenna are separate antennas.

4. The RFID reader of claim 1, wherein the IR transmitter, the transmit antenna, the receive antenna and the processor are located within a common housing of a device.

5. The RFID reader of claim 1, wherein the transmit antenna, the receive antenna and the processor are located within a common housing of a device and the IR transmitter is located separate from device.

6. The RFID reader of claim 1, wherein the IR sensor is a part of the RFID tag.

7. The RFID reader of claim 1, wherein all of the stored data in the RFID tag is transmitted to the receive antenna.

8. The RFID reader of claim 1, wherein the transmit antenna transmits the interrogation signal in the first direction and also a plurality of directions different from the first direction.

9. A method for detecting radio frequency identification (RFID) tags, the method comprising: outputting an infrared (IR) beam, from an IR transmitter, in a first direction so that an IR sensor of an RFID tag receiving the IR beam adds a flag to stored data in the RFID tag in response to the IR sensor detecting the IR beam; outputting an RF interrogation signal by an RFID reader; receiving a response from the RFID tag to the RF interrogation signal; determining whether the flag is contained in the RFID tag's response to the RF interrogation signal; and determining that the RFID tag is in the first direction relative to the IR transmitter in response to determining that the flag is contained in the RFID tag's response to the RF interrogation signal.

10. The method of claim 9, further comprising determining that the RFID tag is located in a direction other than in the first direction relative to the IR transmitter in response to determining that the flag is not contained in the RFID tag's response to the RF interrogation signal.

11. The method of claim 9, wherein the receiving the response from the RFID tag comprises receiving the stored data in the RFID tag at the receive antenna.

12. The method of claim 9, wherein the outputting the RF interrogation signal by the RFID reader occurs after the outputting of the IR beam.

13. The method of claim 9, wherein the determining whether the flag is contained in the RFID tag's response comprises comparing the RFID tag's response with a predetermined flag value saved on a computing device, wherein the flag comprises the predetermined flag value.

14. The method of claim 9, wherein the determining whether the flag is contained in the RFID tag's response comprises determining that the stored data has been received and comparing the RFID tag's stored data with a predetermined flag that is stored on the RFID reader.

15. The method of claim 9, wherein the adding of the flag to the stored data comprises saving the flag in a memory area of the RFID tag that will be automatically sent to the RFID reader in response to receiving a predetermined RFID interrogation signal.

16. A radio frequency identification (RFID) tag comprising:
- a memory containing stored data;
- an infrared (IR) sensor to detect an IR beam from an IR transmitter from a first direction, wherein a flag is added to the stored data in the memory in response to the IR sensor detecting the IR beam from the IR transmitter from the first direction; and
- at least one antenna to receive an RF interrogation signal from a transmit antenna of an RFID reader and to output a response containing the stored data from the RFID tag to the RF interrogation signal; and
- wherein the RFID tag system is determined to be located in the first direction relative to the IR transmitter in response to determining that the flag is contained in the response to the RF interrogation signal.

17. The RFID tag system of claim 16, wherein the RFID tag system is determined to be located in a direction other than in the first direction relative to the IR transmitter in response to determining that the flag is not contained in the RFID tag system's response to the RF interrogation signal.

18. The RFID tag system of claim 16, wherein the at least one antenna comprises a transmitting antenna and a receiving antenna are separate from each other.

19. The RFID tag system of claim 16, wherein an RFID tag comprises the memory and the at least one antenna, and wherein the IR sensor is separate from the RFID tag.

20. The RFID tag system of claim 16, wherein the memory, the at least one antenna, and the IR sensor are all components of an RFID tag.

21. A radio frequency identification (RFID) system comprising:
- an RFID reader comprising:
  - an infrared (IR) transmitter configured to output an IR beam in a first direction;
  - a transmit antenna to output an RF interrogation signal; and
  - a receive antenna to receive a response containing stored data from an RFID tag to the RF interrogation signal; and
- an RFID tag comprising:
- a memory containing stored data;
- an infrared (IR) sensor to detect an IR beam from an IR transmitter from a first direction, wherein a flag is added to the stored data in the memory in response to the IR sensor detecting the IR beam from the IR transmitter from the first direction; and
- at least one antenna to receive the RF interrogation signal from an RFID reader and to output a response containing the stored data from the RFID tag system to the RF interrogation signal; and
- wherein the RFID tag is determined to be located in the first direction relative to the IR transmitter in response to determining that the flag is contained in the response to the RF interrogation signal.

22. A method of an radio frequency identification (RFID) tag comprising:
- detecting, from an infrared (IR) sensor, an IR beam from an IR transmitter from a first direction, wherein a flag is added to stored data in memory of the RFID tag in response to the IR sensor detecting the IR beam from the IR transmitter from the first direction relative to the IR transmitter;
- receiving, from at least one antenna, an RF interrogation signal from a transmit antenna of an RFID reader;
- outputting a response containing the stored data from the RFID tag to the RF interrogation signal, which causes an RFID reader system to determine that the RFID tag is located in the first direction relative to the IR transmitter in response to determining that the flag is contained in the response to the RF interrogation signal.

* * * * *